United States Patent

[11] 3,528,407

[72] Inventors: Jacques Espagno
Vigoulet;
Lucien Espagno; Chanh Trung Huynh,
Pau, France
[21] Appl. No.: 528,592
[22] Filed: Feb. 18, 1966
[45] Patented: Sept. 15, 1970
[73] Assignee: Societe Nationale des Petroles d'Aquitaine
[32] Priority: Feb. 22, 1965, Sept. 28, 1965, Sept. 28, 1965
[33] France
[31] Nos. 6567, 32859 and 32860

[54] RADIOACTIVITY SENSING APPARATUS FOR MEASURING THE BLOOD FLOW
4 Claims, 4 Drawing Figs.

[52] U.S. Cl. ............................................ 128/2.05
[51] Int. Cl. ............................................. A61b 5/02
[50] Field of Search ............................. 128/1.1, 2, 2.05, 2.1; 250/71.5, 65

[56] References Cited
UNITED STATES PATENTS
3,057,998  10/1962  West ........................... 250/65
3,268,728  8/1966  Stoddart ....................... 250/71.5

OTHER REFERENCES
"Kreislaufdiagnostih," published by Georg Thieme, 1962, in Stuttgart, Germany, page 22–28.

Primary Examiner—William E. Kamm
Attorney—Ostrolenk, Faber, Gerb and Soffen

ABSTRACT: A device for measuring blood flow through the use of radioactive isotopes. The radioactive tracer is injected into the organ through which blood flow is to be measured. A detector measures the level of radioactivity by passing pulses at selected intervals to a counter. Successive counts for successively equal time periods are accumulated into the counter wherein the counter is cleared between the accumulation of each count during the successively equal length time period. Any changes in the counts appear at an output meter to indicate a differentiated version of the count which is proportional to blood flow. Circuitry is provided for adjusting the rate of application of pulses to the counter to maintain the count near the capacity of the counter for more accurate measurement. Further means are provided for developing a count of the number of pulses generated during each time interval to provide an operator with the rate of change of decay occurring during succeeding time intervals.

Patented Sept. 15, 1970

INVENTORS
JACQUES ESPAGNO
LUCIEN ESPAGNO
CHANH TRUNG HUYNH
By OSTROLENK, FABER, GERB & SOFFEN
ATTORNEYS

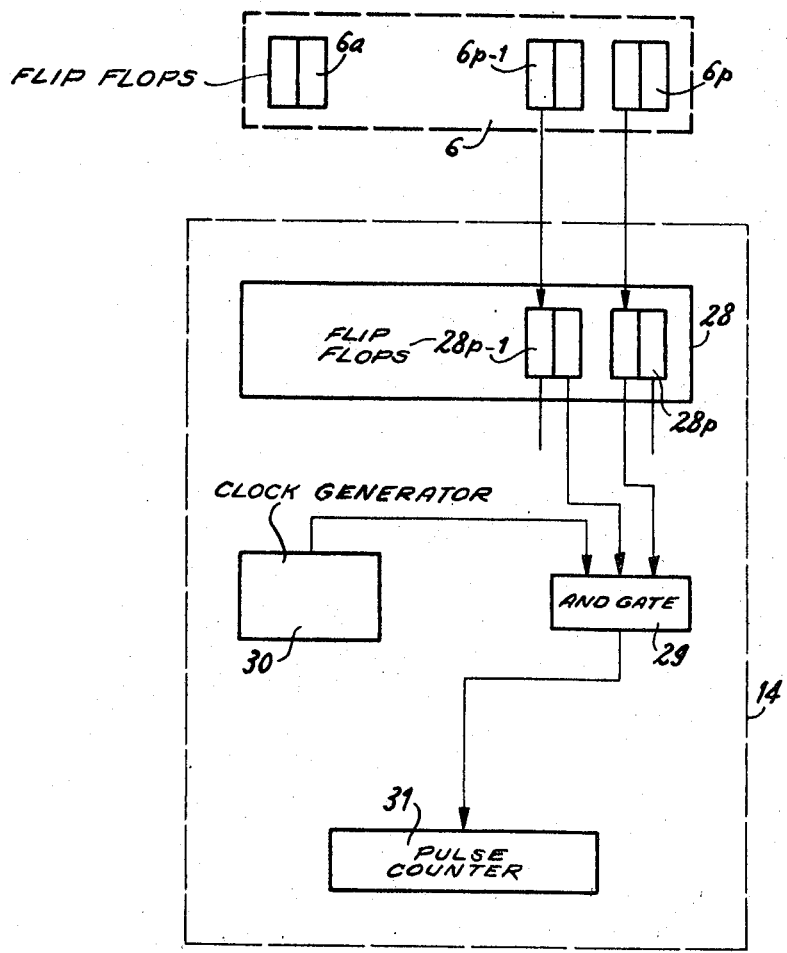

RADIOACTIVITY SENSING APPARATUS FOR MEASURING THE BLOOD FLOW

The present invention has for its object an apparatus for measuring the blood flow in an organ into which a radioactive tracer has been injected.

N. A. Lassen et al. have shown that the law of decay of the radioactivity of an element, such as, for instance, Xenon 133, which has been injected into an organ, is exponential. They have defined a so-called "biological period" which is, in the above example, about 2 to 15 minutes. The length of the "biological period" is also inversely proportional to the rate of blood flow. Should the blood flow be completely stopped, the period then becomes equal to the period of the radioelement proper, i.e, 5 days for Xenon 133.

Such a period is long enough, as compared to biological periods, for enabling one to neglect the biological decay period. Finally, it has been shown that the blood flow is proportional to the logarithmic decrement of the exponential function which represents the radio-activity decay of the injected element.

There are known means for measuring the decay period of a radioactive material. For that purpose, one may use a binary counter which totalizes, during predetermined time intervals, pulses generated by a nuclear radiation detector. The count of the counter is periodically transferred to memory units and a computer, for instance of the digital electronic or electro-mechanical type, which calculates the said period from two successive counts.

Prior art devices are, in general, especially designed for the control of nuclear reactors and they are not adapted for readily providing a direct reading or record of a blood flow.

It is an object of this invention to provide a direct-reading blood flow measuring instrument which is accurate, simple in design, and does not require any complex adjustment which could not be effected by the operator, for instance the surgeon in the course of an operation.

According to the invention, an apparatus for measuring the blood flow in an organ into which a tracer has been injected includes a nuclear radiation detector device, a binary counter connected at the output of the detector device, a memory unit, a logical device adapted for controlling the operation of the counter during equal successive time intervals and for transferring the count from the counter to the memory unit at the end of each time interval, and is characterized in that, the said time intervals are short with respect to the decay period of the nuclear emission, the memorized counts being proportional to $e^{-kt}$, $k$ being the logarithmic decrement of the function which represents the law of emission, the apparatus further comprising: a digital-to-analog converter which is connected at the output of the memory unit, and drives a diode mounted in series with a resistor, across which is connected a differentiating circuit of the resistor-capacitor type; and a recording or measuring device, mounted across the resistor of the differentiating circuit, for providing a direct reading of the blood-flow.

According to one important feature of the invention, the apparatus further comprises means for automatically adjusting the duration of the said time intervals, so that at the end of the first time interval, the counter is filled up substantially to its maximal capacity.

The invention will be more clearly understood from the following description, taken in conjunction with the appended drawings, in which:

FIG. 4 illustrates a preferred embodiment of the device 14 of FIG. 1.

Figure 1:
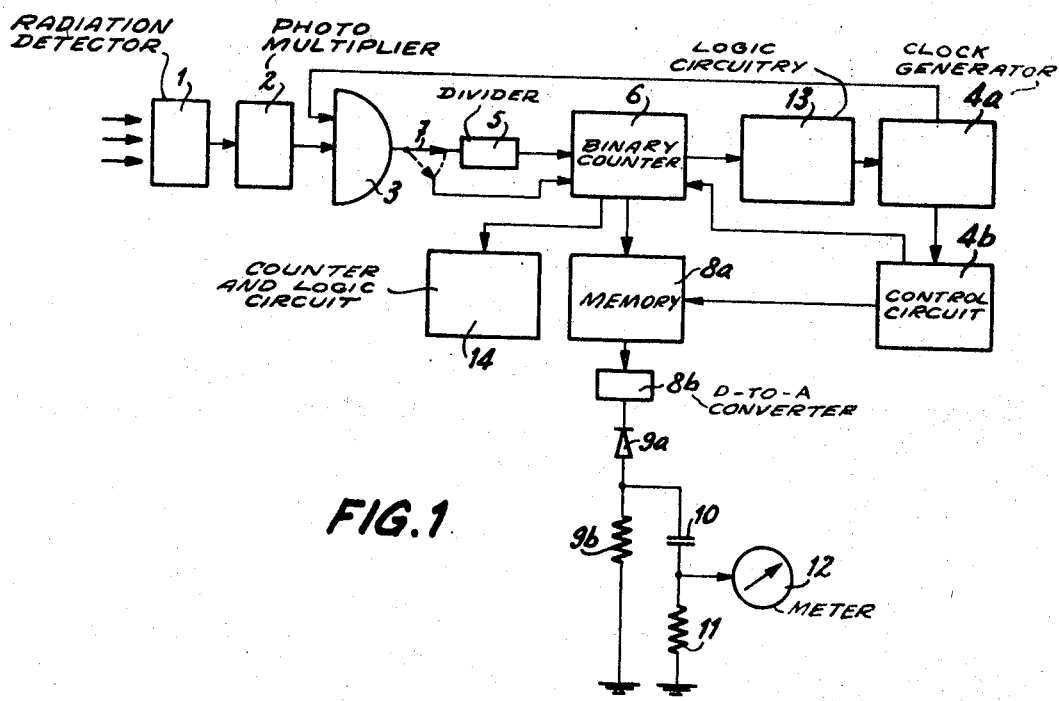
FIG. 1 is a block diagram of an apparatus according to the invention.

A proportional detector 1 is exposed to the radiation generated by a radioactive isotope, such as Xenon 133, which is localized in a predetermined organ of a patient. A photomultiplier 2, connected at the output of detector 1 generates pulses which, after being properly shaped and selected by means of known devices, not illustrated in the drawings, are applied to one input of an AND-gate 3.

The other input of gate 3 is connected to a clock generator 4a consisting, as a non-limitative example, of a uni-junction transistor associated with a resistor-capacitor circuit.

The latter circuit opens the gate during successive time intervals T and closes it for Θ microseconds at the end of each of the said time intervals.

A binary counter 6 is connected to the output of gate 3 either directly, or through a scale-of-two divider circuit 5 which divides by two the pulse frequency, according to the position of a switch 7.

The count of counter 6 is transferred, at times which are determined by a logical device 4b which cooperates with the clock generator 4a, as will be explained in detail hereinafter, to a memory unit 8a.

At the output of unit 8a is connected a digital-to-analog converter 8b in turn connected to an analog differentiating circuit.

The latter circuit includes a diode 9a in series with a resistor 9b a across which is connected a differentiating circuit consisting of a capacitor 10 in series with a resistor 11.

A measuring of recording device 12 is connected across resistor 11 and adapted to provide a direct reading or record of the blood flow.

Figure 3:
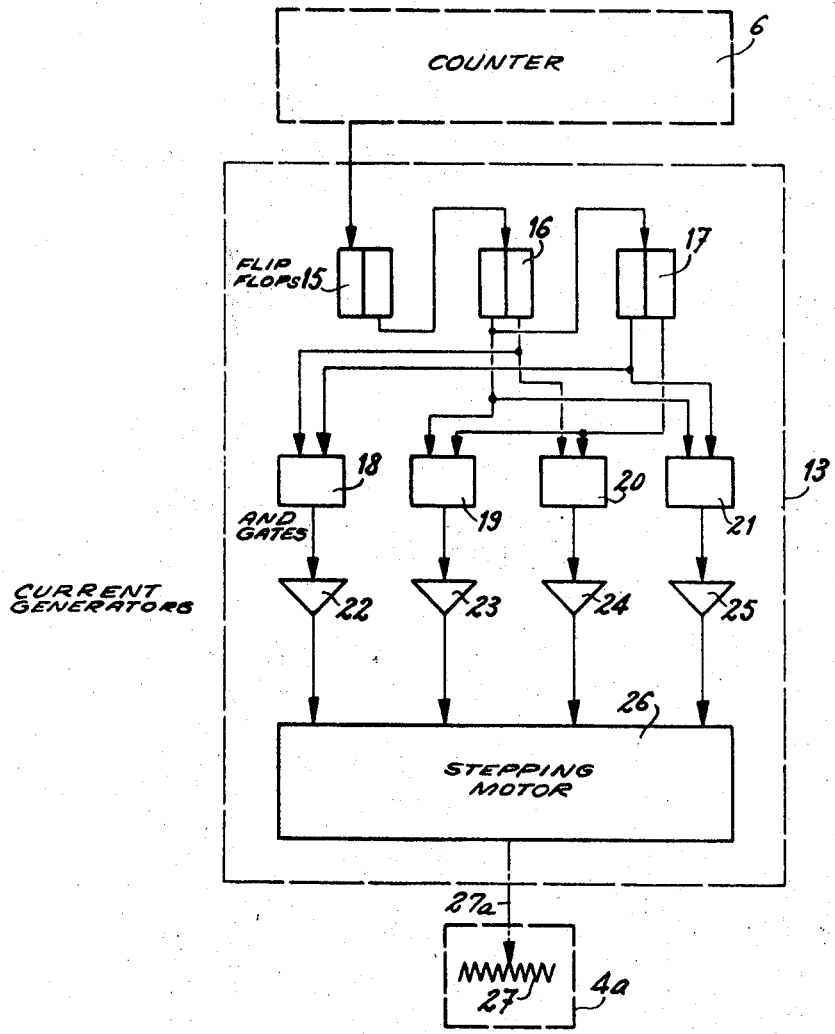
FIG. 3 illustrates a preferred embodiment of the device 13 of FIG. 1.

According to a preferred embodiment of the invention, the apparatus further comprises a device 13, an embodiment of which will be disclosed hereinafter with reference to FIG. 3. The device 13 is adapted—through the control of the clock 4a—for automatically adjusting the pulse counting time in such a way that, at time $t_1$ as hereinafter defined, the maximal capacity of the counter will substantially be reached.

It is advantageous further to provide the apparatus with a device 14, an embodiment of which will be disclosed hereinafter with reference to FIG. 4. The device 14 is adapted for measuring and displaying the decay period, i.e. the time interval during which the blood flow value is divided by two.

Figure 2:
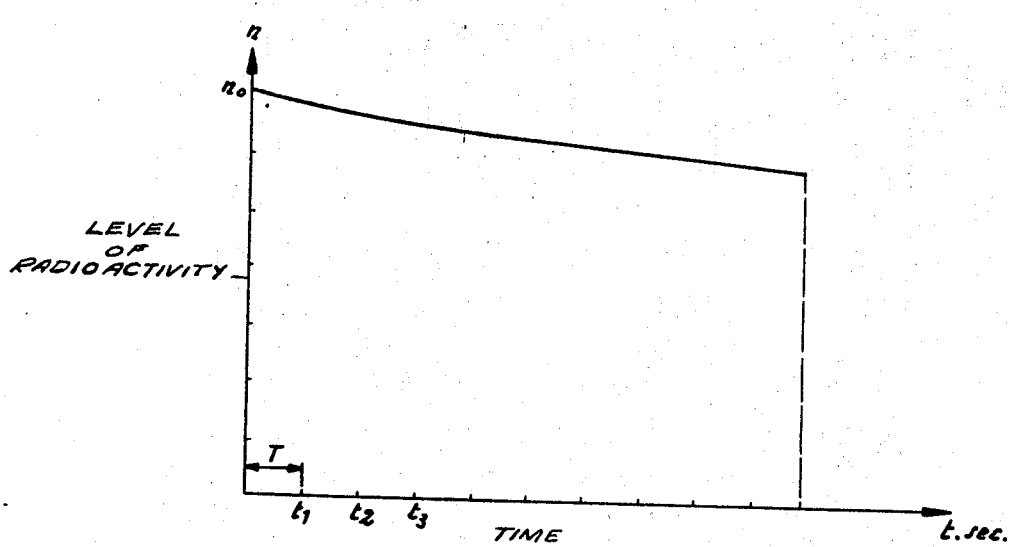
FIG. 2 shows a comparatively small portion, corresponding to the duration of a measurement, of the curve representing the decrease of the radio-activity of an element which has been injected in an organ.

The operation of the apparatus is as follows:

The curve in FIG. 2 illustrates the number $n$ of pulses as a function of time $t$, expressed in seconds. As well known, the rate of decay of a biologically inert radio-active tracer, capable of being freely diffused in animal or human tissue, is a function of the rate of blood flow within the tissue.

In the case of Xenon 133, the tracer is fully expelled during the first pulmonary cycle. N being the number of radio-active atoms at time $t$, No the value thereof at time $o$ when the measurement is started, $k$ a coefficient which is a function of the blood flow and of the sharing coefficient of Xenon between blood and tissue, and $e$ is the base (2.71828) of natural logarithms, one may write:

$$N = No e^{-kt}$$

Finally as the above defined number $n$ is proportional to the number of Xenon atoms which are present in the tissue at time $t$, one has:

$$n = n_o e^{-kt}$$

The above relation corresponds to the exponentially decaying curve a small portion of which is shown in FIG. 2. The decay period is about 200 seconds, during which the Xenon radioactivity decay proper may be neglected.

At time $o$, counter 6 and memory unit 8 are empty. The clock generator 4a then generates a pulse which opens gate 3, and the pulses from photomultiplier 2 are directly applied to counter 3, the switch 7 being positioned as illustrated by the solid line.

At time $t_1$, a time interval T, about one second for instance, after time $o$, the clock generator 4a closes the gate for a time interval $\Theta$ of a few micro-seconds, negligible with respect to T.

Logic circuit 4b controls, during time interval $\Theta$, the transfer of the count from counter 6 to memory unit 8a and the resetting of the latter to zero. Then, the gate is opened again and a new count is started, during a second time interval T from $t_1$ to $t_2$. At the end of the second time interval, the logic circuit successively controls the count from the counter to the memory unit and resetting of the counter. A third counting time interval T is then started, unit time $t_3$, and so on.

Logic circuit 4b will be easily designed by means of flip-flops which will transmit, with suitable time delays, the control pulses generated by the clock generator for stopping the counter.

At the end of each counting time interval T, the current I(t) which flows through diode 9a, at the output of digital-to-analog converter 8b, is proportional to the count reached by the counter. It is observed that time interval T is negligible with respect to the decay period of $n$, therefore, the value of $n$ has suffered but little variation during the said time interval (as clearly appears from the curve portion in FIG. 2). It results that I(t) is proportional to $e^{-kt}$, and may be written:

$$I(t) = I_o e^{-kt}$$

As diode 9a operates in one portion of its characteristic curve of current-versus-voltage wherein the voltage is proportional to Log I, it finally results that the said voltage is proportional to $-kt$.

Therefore, the differentiating circuit 10—11 finally provides, across resistor 11, a voltage proportional to $d(-kt)/dt$, i.e. proportional to the increment $k$ which is to be measured or recorded.

It will be observed that, should the blood flow vary in the course of measurement, the variation thereof will be displayed on unit 12, provided the latter has a suitable time constant.

It is to be understood that the apparatus is capable of operating with various radioactive materials, provided that they have a comparatively large period, as compared to the time interval during which the measurement is effected.

The scale-of-two circuit 5, which can in fact be omitted, obviously enables one to double the measurement scale of the apparatus. It further facilitates the calibration of the apparatus.

A preferred embodiment of device 13 of FIG. 1 will now be described with reference to FIG. 3. The said device includes a plurality of flip-flops —for instance three—designated in the drawing by the reference numerals 15—16—17, and serially connected at one output of counter 6. Each flip-flop has two outputs, which will be referred to hereinafter as "direct" and "complementary." The direct output of flip-flop 16 is connected to one input of an AND-gate 19 and to one input of another AND-gate 21. The complementary output of flip-flop 16 is connected to one input of a third AND-gate 20 and to one input of a fourth AND-gate 18. The direct output of flip-flop 17 is connected to the other respective inputs of gates 18 and 21, whereas the complementary output of flip-flop 17 is connected to the other respective inputs of gates 19 and 20.

The respective outputs of the gates are connected to the control inputs of current generators 22 to 25. The outputs of the generators control a stepping motor 26, which drives the slider 27a of a potentiometer 27. The latter is included in the circuits of the clock generator 4a and is adapted to adjust the pulse period thereof. This adjustment is for example obtained through modifying the resistance of a resistor-capacitor circuit, or through any other suitable means.

It is to be understood that units 22 to 27, the design of which will be readily made by those skilled in the art, could be substituted by any suitable known means for adjusting the pulse period of the clock when triggered by the output signals from the gates.

The device shown in FIG. 3 operates as follows:

As soon as counter 6 has exceeded its maximal capacity, the incoming pulses are successively transferred to the flip-flops 15 to 17, which together form a shift register.

The gates 18 to 21 decode the number of the exceeding pulses which is displayed by the said shift register and, according to the value of the said number, they trigger one or more of the generators 22 to 25.

This has the effect of driving the motor which effects a number of rotation steps which increases as a function of the number of exceeding pulses.

The rotation of the motor has the effect, through displacement of the potentiometer slider of reducing the pulse period of the clock generator and therefore, time interval T is decreased.

It results that the number of the incoming pulses at the input of counter 6 during the reduced time interval $O-t_1$ is also decreased. This number continues to decrease until there are no more exceeding pulses.

Therefore, the counter will finally be substantially filled at its maximum capacity at time $t_1$.

This feature is of particular interest since as the emission of radiation by the tracer is a random phenomenon, the error in counting will be smaller as the number $n$ counted during time interval T increases. The number $n$ should therefore be as close as possible to the maximal capacity of the counter. However, in practical operating conditions, the operator has no time for adjusting the apparatus and further lacks the necessary information for performing the adjustment.

Therefore, it is of the utmost importance that the apparatus should provide for automatic adjustment.

It is to be understood that those skilled in the art are capable of designing various types of servo-control means for adjusting the pulse period of the clock generator as a function of the maximal capacity of the counter and of the rate of the incoming pulses. However, the embodiment of such a means which has been disclosed hereinabove has a simple design and is particularly well adapted for use in the apparatus which is the object of the present invention.

Though the method for measuring the blood flow as herein disclosed is based on the determination of the logarithmic decrement, the operator, in certain instances, needs to rapidly know the decay period; for example in view of building in a short delay two representative points of the curve $n(t)$, the operator, after having determined of the period, will measure the logarithmic decrement in two regions of the curve separated by a time interval equal to the period. A rough knowledge of the behavior of the decay phenomenon is thus obtained, and may be used in view of a classification, before a further more detailed analysis.

As discussed hereinabove, there are known methods for determining the period of an exponentially decaying phenomenon.

The present invention provides particularly simple means (14, FIG. 1), which can be readily associated with the apparatus disclosed hereinabove.

In the preferred embodiment thereof which is shown in FIG. 4, a memory unit 28 is associated with counter 6. The latter is comprised of a plurality of $p$ bi-stable units or flip-flops 6a, $6a+1$, $6p-1$, $6p$, which are interconnected in a known manner, not illustrated in the drawing.

Memory 28 includes two bi-stable units $28p-1$ and $28p$, the "direct" inputs of which are respectively connected to the "direct" outputs of flip-flops $6p-1$ and $6p$.

The "complementary" output of flip-flop $28p-1$ and the "direct" output of flip-flop $28p$ are connected to two inputs of an AND-gate 29, the third input of which is connected to the output of a clock generator 30. The output of gate 29 is connected to a pulse counter 31.

The count of the latter is proportional to the time interval during which gate 29 is opened, which is in turn equal to the decay period. In effect, gate 29 is opened when the "direct" outputs of the flip-flops $6p-1$ and $6p$ are respectively in their one and zero binary states. It will be readily apparent that this corresponds to the time interval during which the count of counter 6 goes from one-half to one-fourth of its maximal capacity.

We claim:

1. An apparatus for measuring the blood flow in an organ into which a radioactive tracer has been injected, said apparatus comprising: a nuclear radiation detector device having an output; an AND-gate having first and second inputs and an output, means connecting the output of said detector to the first input of said AND-gate; a binary counter having a pulse input, a control input and an output; means connecting the output of the AND-gate to the pulse input of the counter; a clock generator having an output connected to the second input of the AND-gate; a memory unit having an input connected to the output of the counter and an output; a logical device having an input connected to the output of the clock generator and an output connected to the input of the memory unit and to the control input of the counter; a digital-to-analog converter having an input connected to the output of the memory unit and an output; a first resistor having first and second terminals, said second terminal being grounded; a diode connecting the output of the converter to said first terminal; a second resistor having first and second terminals, said second terminal being grounded; a capacitor connecting the first terminal of the first resistor to the first terminal of the second resistor and a display unit connected across said second resistor.

2. An apparatus as claimed in claim 1, said apparatus further comprising control means for automatically adjusting the duration of the pulse period of the clock generator as a function of the condition of filling of the counter to its capacity, said control means having an input connected to said binary counter and an output connected to said clock generator.

3. An apparatus as claimed in claim 1, wherein said binary counter includes a plurality of $p$ interconnected bi-stable units arranged in the successive order or $1, 2, ..., p-1, p$ respectively; said apparatus further comprising: means for measuring the decay period of the radioactive tracer injected in an organ, said measuring means comprising: first and second bi-stable units, each having two outputs, the first bi-stable unit being connected to the bi-stable unit of order $p$, whereas the second bi-stable unit is connected to the bi-stable unit of order $p-1$ of the binary counter; a further AND-gate having first, second and third inputs and an output, said first and second inputs being respectively connected to one output of said first and second bi-stable units; a further clock generator connected to the third input of said further AND-gate; a further counter and means connecting the output of said further AND-gate to said further counter.

4. An apparatus as claimed in claim 2, wherein said control means include a plurality of bistable units serially connected at the output of said binary counter, each of said bi-stable units having two outputs; a plurality of further AND-gates each having two inputs and one output; means connecting the outputs of the bi-stable units to the inputs of said further AND-gates; a plurality of current generators each having a control input and an output, the control inputs of said current generators being respectively connected to the outputs of said further AND-gates; a stepping motor having control inputs respectively connected to the outputs of said current generators; a potentiometer in said clock generator, said potentiometer having a slider and a driving connection between said slider and said stepping motor; said potentiometer forming part of said clock generator for adjusting the clock rate.